United States Patent
Oumi et al.

(10) Patent No.: US 7,734,415 B2
(45) Date of Patent: Jun. 8, 2010

(54) NAVIGATION SYSTEM

(75) Inventors: Masanori Oumi, Gifu (JP); Takamitsu Suzuki, Okazaki (JP); Hirotoshi Iwasaki, Tokyo (JP); Kousuke Hara, Tokyo (JP); Nobuhiro Mizuno, Tokyo (JP)

(73) Assignees: DENSO CORPORATION, Kariya (JP); Denso IT Laboratory, Inc., Tokyo (JP)

( * ) Notice: Subject to any disclaimer, the term of this patent is extended or adjusted under 35 U.S.C. 154(b) by 163 days.

(21) Appl. No.: 11/546,566

(22) Filed: Oct. 12, 2006

(65) Prior Publication Data

US 2007/0088502 A1    Apr. 19, 2007

(30) Foreign Application Priority Data

Oct. 13, 2005   (JP) .............................. 2005-299241

(51) Int. Cl.
*G01C 21/30*   (2006.01)

(52) U.S. Cl. ...................................... 701/211

(58) Field of Classification Search ................. 701/200, 701/201, 205, 207, 208, 209, 210, 211, 213; 340/995.2, 995.21, 995.22, 995.1
See application file for complete search history.

(56) References Cited

U.S. PATENT DOCUMENTS 6,064,941 A * 5/2000 Nimura et al. .............. 701/210
7,226,450 B2 * 6/2007 Athanasiou et al. ........... 606/80
7,266,450 B2 * 9/2007 Glaza ......................... 701/210
2004/0199325 A1 * 10/2004 Kishigami .................. 701/210

FOREIGN PATENT DOCUMENTS

| JP | A-10-339649 | 12/1998 |
|----|-------------|---------|
| JP | A-2000-009484 | 1/2000 |
| JP | A-2004-033467 | 11/2004 |
| JP | A-2004-0333467 | 11/2004 |
| JP | A-2006-064563 | 3/2006 |

OTHER PUBLICATIONS

Notice of Reason for Rejection issued from the Japanese Patent Office on Mar. 2, 2010 in the corresponding Japanese patent application No. 2005-299241 (a copy and English translation thereof).

* cited by examiner

*Primary Examiner*—Imran Mustafa
(74) *Attorney, Agent, or Firm*—Posz Law Group, PLC

(57) ABSTRACT

When a vehicle deviates from a guide route at a first branch point, the state of the first branch point is memorized. Afterward, when a second branch point becomes a target for a route guide and the state of the second branch point is similar to the memorized state, a user of the vehicle is provided with a guide for preventing deviation from the guide route at the second branch point with a manner of the guide changed. This procedure allows learning of tendency of the user with respect to a state apt to cause the user to mistake a guide route. A guide to help prevent a user from deviating from a guide route at a branch point can be thus performed appropriately.

22 Claims, 3 Drawing Sheets

NAVIGATION SYSTEM

CROSS REFERENCE TO RELATED APPLICATION

This application is based on and incorporates herein by reference Japanese Patent Application No. 2005-299241 filed on Oct. 13, 2005.

FIELD OF THE INVENTION

The present invention relates to a navigation system having a route guide function to indicate a route to a destination.

BACKGROUND OF THE INVENTION

A navigation system has a route guide function, in which a route guide is performed when a subject vehicle approaches a guide-target intersection (or guide-target branch point), at which the vehicle needs to turn right or left in order to follow a guide route to a destination. For instance, an enlarged guide image around the intersection is displayed in a screen window on a display unit and, furthermore, an audio guide, e.g., "turn left xx meters ahead" is sounded.

Patent document 1 proposes a navigation system to appropriately perform a route guide for a user at a guide-target branch point. This navigation system performs a route guide each time a subject vehicle approaches a guide-target branch point. The navigation system memorizes alert information relating to both a certain guide-target branch point and its surroundings on the guide route when the vehicle deviates from the certain guide route.

The navigation system afterward outputs an alert based on the memorized alert information when the vehicle approaches the same certain guide-target branch point on the same guide route. This helps prevent a user of the vehicle from deviating again from the guide route at the certain guide-target branch point.

Patent Document 1: JP-2000-9484 A

In contrast, the navigation system in Patent document 1 outputs no alert when the vehicle does not enter the same certain guide-target branch point by following the same guide route. The same user does not frequently mistake a guide route at the same branch point. Therefore, the navigation system in Patent document 1 may not effectively prevent a user from deviating from a guide route using the alert outputted.

Another method may be used to enhance effectiveness. For instance, when a certain intersection has a tendency to cause a user to mistake a guide route, the certain intersection is previously designated. An alert is thereafter outputted only when a subject vehicle approaches the certain intersection designated. This method may still bother a user who hardly mistakes a guide route.

SUMMARY OF THE INVENTION

It is an object of the present invention to provide a navigation system, which effectively provides a guide to help prevent deviation from a guide route.

According to an aspect of the present invention, a navigation system for a vehicle is provided as follows. A position detector detects a current position of the vehicle. A map data storage unit stores road map data. A route designating unit designates a guide route to a destination based on the road map data and the current position. A route guide unit outputs a guide to indicate a route for the vehicle to take at a guide-target branch point, which is a target for the guide on a guide route, when the vehicle approaches the guide-target branch point. A state storage unit stores a state of a branch point, at which the vehicle deviates from a guide route. A similarity determining unit determines whether a state of the guide-target branch point is similar to the stored state. A guide change unit changes a manner of a guide at the guide-target branch point when the state of the guide-target branch point is determined to be similar to the stored state.

According to another aspect of the present invention, a route guide method in a navigation system for a vehicle is provided with the following: storing a state of a branch point, which is apt to cause the vehicle to deviate from a guide route; determining whether a state of a guide-target branch point, which is a target for a guide on a guide route, is similar to the stored state when the vehicle approaches the guide-target branch point; and changing a manner of a guide at the guide-target branch point when a state of the guide-target branch point is determined to be similar to the stored state.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
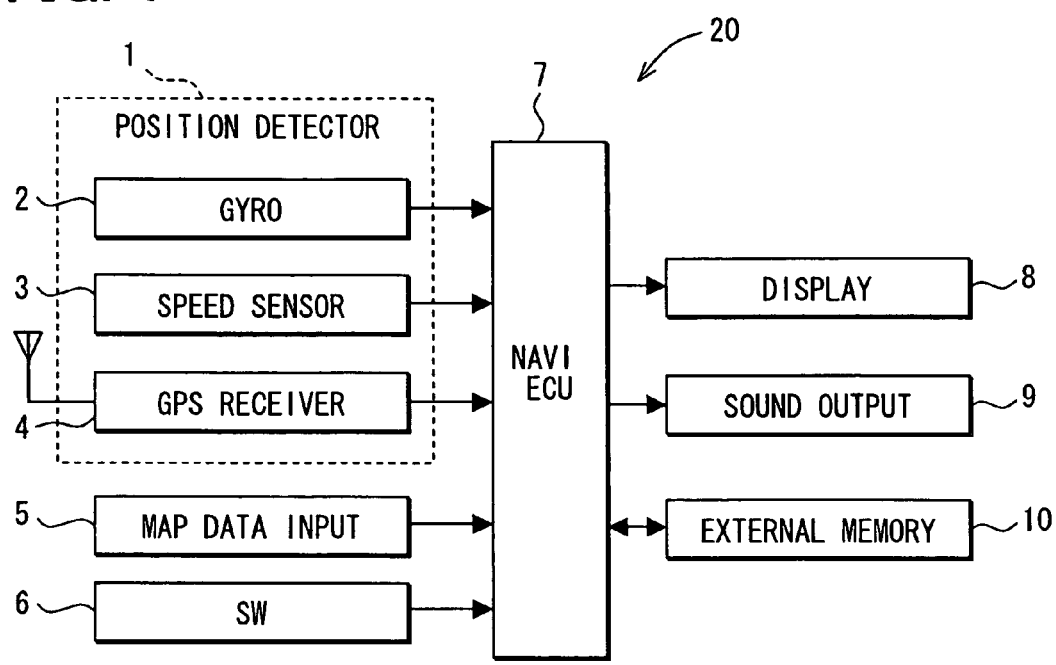
FIG. 1 is a diagram illustrating an overall structure of a navigation system as an example of an embodiment according to the present invention.

A navigation system 20 mounted in a subject vehicle will be explained as an example of an embodiment according to the present invention. A block diagram in FIG. 1 illustrates an overall structure of the navigation system 20. The navigation system 20 includes the following: a position detector 1, a map data input unit 5, an operation switch group (SW) 6, a display device 8, a sound output device 9, an external memory device 10, and a navigation ECU (Electronic Control Unit) 7 connected with the foregoing components.

The navigation ECU 7 is a usual computer including a known CPU, ROM, RAM, I/O, and bus line connecting the foregoing components. The ROM stores a program the navigation ECU 7 executes. The CPU or the like executes arithmetic processes based on the program.

The position detector 1 includes known components: a gyroscope 2, a speed sensor (or distance sensor) 3, and a GPS (Global Positioning System) receiver 4, which detects a position of the subject vehicle based on electric waves from satellites. These sensors have individually different types of detection errors; therefore, the sensors are used to complement each other. The navigation ECU 7 detects a current position and heading direction of the vehicle based on signals from the sensors of the position detector 1. The position detector 1 may consist of part of the sensors or may include another sensor, depending on required measurement accuracy.

The map data input unit 5 inputs map data necessary for drawing road maps to the navigation ECU 7. The map data include road map data such as node data, link data, and landmark data of place names and facilities. The map data input unit 5 includes a storage medium to store map data. The storage medium includes CD-ROM or DVD-ROM based on a stored data volume. Otherwise, the medium may be a rewritable medium such as memory card or hard disk.

Node data and link data will be explained below. A node is a point at which multiple roads intersect, converge, or diverge. Node data include, with respect to each node, a unique node ID, coordinates, connected link IDs, a branch point type, a branch point name, presence/absence of traffic lights, and presence/absence of sign boards. A link is a road between nodes. Link data include, with respect to each link, a unique link ID, a link length, coordinates of starting and terminating nodes, a road type (e.g., expressway, toll road, national road, prefectural road, city road, alley (hereafter "town narrow road" or "alley")), a road width, the number of lanes, a travel time, and a regulatory speed.

Node data and link data are used for drawing roads on maps or retrieving a guide route from a departure point to a destination using the known Dijkstra method or the like.

The operation switch group 6 includes mechanical switches and/or touch switches integrated in the display device 8 for data input. For instance, the operation switch group 6 allows a user to designate a departure point, a passing point, and a destination for setting a route in a route guide function. The route guide function can be provided by the navigation system 20 in addition to a navigation function, which indicates a current position of the vehicle and surrounding areas. A departure point is a current position unless otherwise designated. A passing point may be optionally designated.

The navigation ECU 7 retrieves a guide route from a departure point to a destination using the known Dijkstra method when the departure point and destination are designated. The navigation ECU 7 starts a route guide based on the retrieved guide route, upon receiving an instruction via the operation switch group 6.

The display device 8 includes a liquid crystal display to display, in its screen, a mark of a current position of the vehicle and a road map surrounding the current position based on the map data inputted from the map data input unit 5. In a route guide function, a road map highlighting a guide route appears in the screen. Further, when a vehicle approaches a guide-target branch point, an enlarged guide image of proximity of the guide-target branch point also appears. A guide-target branch point is a branch point defined as follows: a route guide relative to a branch point is performed for the subject vehicle to follow a guide route at the branch point. A guide-target branch point includes (i) an intersection at which the subject vehicle needs to turn right or left so as to follow a guide route, or (ii) an entrance/exit of an expressway, at which the subject vehicle needs to use so as to follow a guide route.

The sound output device 9 outputs an audio guide to indicate a heading direction of the vehicle at the guide-target branch point when the vehicle approaches the guide-target branch point in the route guide function. Furthermore, the sound output device 9 is also used when the navigation system 20 draws user's attention to a branch point where the user is apt to mistake a guide route. For instance, the sound output device 9 vocalizes a notice "pay attention to an intersection similar to an intersection where you mistook a guide route."

The external memory device 10 stores as a branch point state database, a state of a branch point where the user mistook a guide route (hereinafter also called a route-deviated branch point), in addition to a memory position registered by the user. The stored state of a route-deviated branch point includes at least one of (i) a configuration of the route-deviated branch point, (ii) a relationship with a neighboring branch point, and (iii) a road environment arising when entering the route-deviated branch point (hereinafter called a road-entering environment). In other words, thus, the external memory device 10 can store the branch point state database as determination information used to determine whether a guide-target branch point has a state similar to that of a route-deviated branch point.

A branch point configuration may include an overall configuration of a branch point such as a junction of five roads, a junction of six roads, or a junction with an overpass/underpass, or include the number of exit roads and individual angles of the exit roads, with respect to the entrance road. The relationship with a neighboring branch point includes a distance to the neighboring branch point or similarity between the guide-target branch point and the neighboring branch point in the configuration. Further, the road-entering environment includes (i) information that an exit road is shaded by a building to be not clearly viewed, and (ii) presence/absence of a landmark facility, a sign board, traffic lights, or a branch point name.

Next, a feature of the example, i.e., a route guide process, will be explained with reference to a flowchart in FIG. 2. The route guide process includes notification or guide for preventing deviation from a guide route.

At Step S100, a guide route is set based on a departure point and destination designated by a user. At Step S110, a map, which highlights a current position of the vehicle and the guide route, is displayed, and a route guide starts. Setting a guide route or starting a route guide is performed based on an instruction of a user.

At Step S120, a current position is contrasted or compared with the guide route. At Step S130, it is determined whether it is a guide time point, when a guide is executed for a guide-target branch point, based on a contrast result at Step S120. This guide time point may be determined, e.g., based on a distance between the current position and the guide-target branch point. The guide time point is determined when the vehicle or the current position reaches a guide position, which is short of the guide-target branch point by a predetermined distance. The guide position may be set to each of 700 m, 300 m, and 100 m short of the guide-target branch point, and the guide may be executed in multiple times for the guide-target branch point. When it is determined that it is a guide time point at Step S130, the sequence of the flowchart goes to Step S140. When it is determined that it is not a guide time point at Step S130, the sequence goes to Step S180.

At Step S140, a state of the guide-target branch point is compared with states of route-deviated branch points in the branch point state database in the external memory device 10. The state of the guide-target point may be extracted from node data of the map data or computed using link data or landmark data. For instance, node data includes a branch point type, which allows extraction of an overall configuration of the node or branch point. When a branch point configuration includes the number of exit roads and individual angles of the exit roads, with respect to the entrance road, a configuration to be compared can be computed using link data. Further, whether or not an exit road is shaded by a building to be not clearly viewed can be computed based on a relationship among the exit road, entrance road, and the building using link data and landmark data.

At Step S150, it is determined whether the state of the guide-target branch point is similar to the state of the route-deviated branch point in the database based on a comparison result at Step S140. When the similarity is affirmed at Step S150, the sequence goes to Step S160. When the similarity is negated at Step S150, the sequence goes to Step S170.

At Step S160, a usual route guide is performed for the guide-target branch point, and a guide for preventing deviation from a guide route is performed. The usual route guide includes (i) a display on the display device 8 of an enlarged guide image indicating a route (or direction) the vehicle should take at the guide-target branch point, and (ii) an audio guide indicating an heading direction of the vehicle at the guide-target branch point. The guide for preventing deviation from a guide route is performed as an audio guide via the sound output device 9; further, the guide may be simultaneously displayed as a message in the screen of the display device 8. In contrast, at Step S170, the usual route guide alone is performed since the guide-target branch point does not seem to be a branch point at which the vehicle is apt to mistake a guide route.

At Step S180, it is determined whether the vehicle or the current position of the vehicle reaches the destination, or it is determined whether a user stops the route guide. When this determination is affirmed, the process of the flowchart in FIG. 2 is ended. When this determination is negated, the sequence returns to Step S110 and subsequent Steps are repeated.

Figure 3:
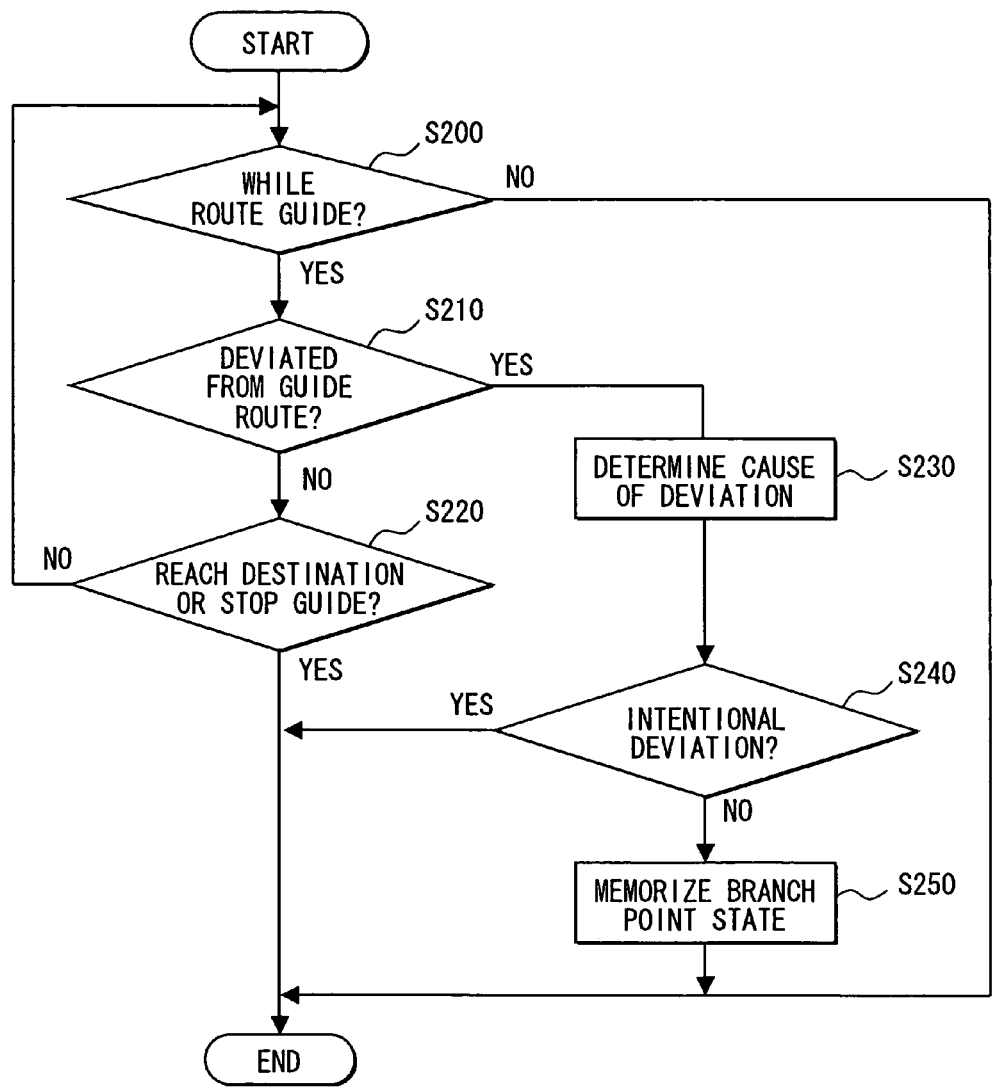
FIG. 3 is a flowchart diagram for a process to memorize a state of a branch point.

Next, a process for storing a state of a route-deviated branch point in the external memory device 10 will be explained with reference to a flowchart in FIG. 3.

Figure 2:
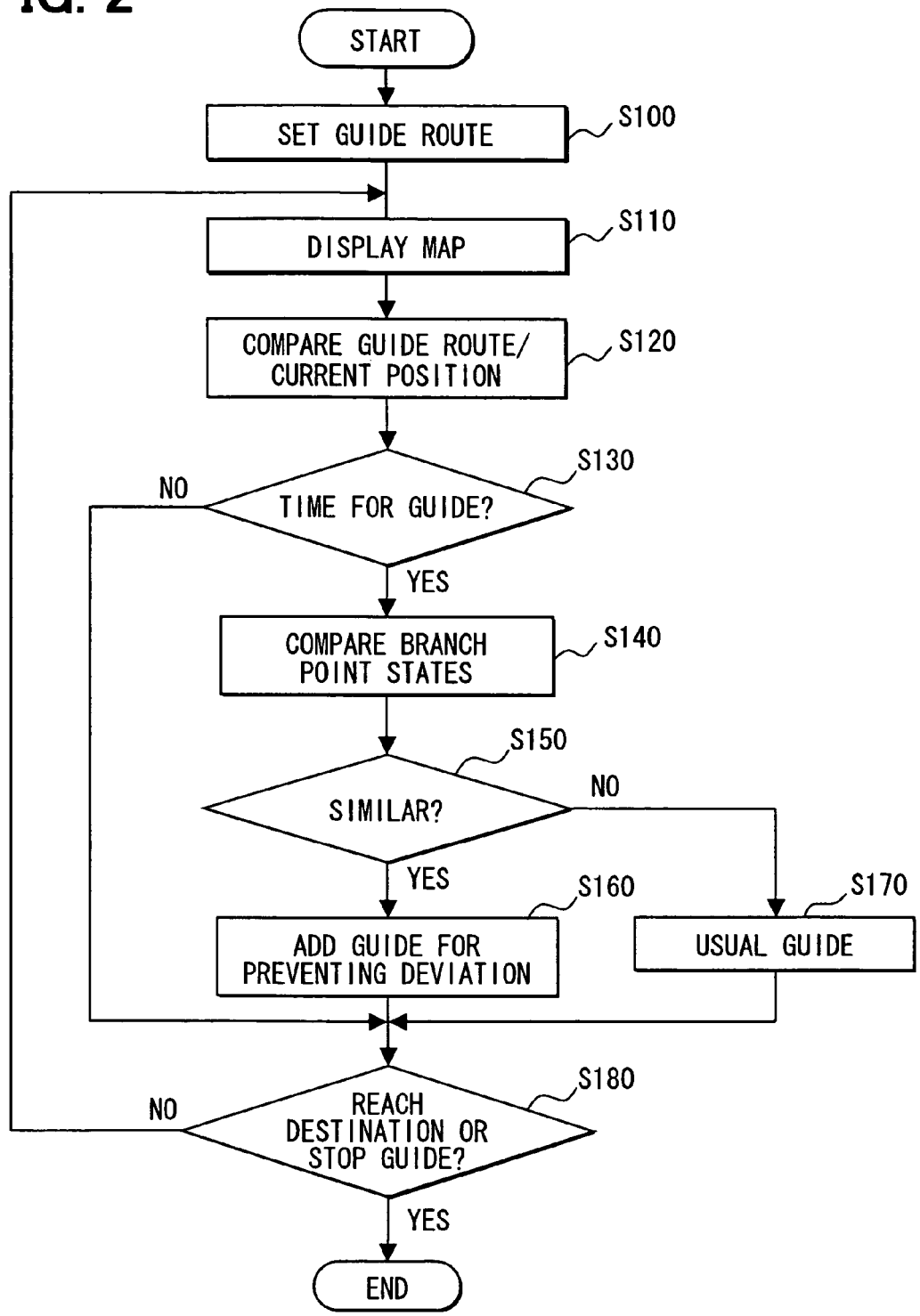
FIG. 2 is a flowchart diagram for a route guide process including a guide for preventing deviation from a guide route.

At Step S200, it is determined whether a route guide process shown in FIG. 2 is performed. When this determination is negated, the process in FIG. 3 ends. In contrast, when the determination is affirmed, the sequence goes to Step S210. At Step S210, it is determined whether the vehicle has deviated from the guide route based on whether the vehicle or current position is located on the guide route. When the vehicle is determined to have not deviated from the guide route, the sequence goes to Step S220. When the vehicle is determined to have deviated from the guide route at Step S210, the sequence goes to Step S230.

At Step S220, it is determined whether the vehicle or current position of the vehicle reaches the destination, or it is determined whether a user stops the route guide. When this determination is affirmed, the process of the flowchart in FIG. 3 is ended.

At Step S230, a cause for the vehicle to have deviated from the guide route, i.e., a guide route deviation cause, is determined. This determination may be executed based on a response of the user to an inquiry whether the user has intentionally deviated from the guide route or not. This enables an accurate determination of the cause.

If this inquiry is made each time the vehicle has deviated from the guide route, this may bother the user. In contrast, another method without inquiry to the user may be adopted; namely, whether the vehicle has deviated intentionally or unintentionally (or mistakenly) may be automatically determined based on a state, which the vehicle has deviated, and running states of the vehicle before and after the vehicle has deviated. The following indicates various methods to automatically determine whether the vehicle has deviated intentionally or mistakenly, i.e., vehicle's intentional deviation or vehicle's unintentional deviation (or vehicle's mistaken deviation).

At first, a travel record is stored, e.g., in the external memory device 10, to indicate roads the vehicle has traveled. Reference to this travel record teaches routes the user traveled in the past. That a vehicle has mistakenly deviated from a guide route, i.e., vehicle's mistaken deviation from a guide route, is determined in the following case: The vehicle traveled a certain route several times in the past and the travel record of the certain route is stored; and the vehicle deviates from the certain route and enters a road, which has no travel record or travel record with a very small frequency.

Another vehicle's mistaken deviation from a guide route is determined when a configuration of a branch point, at which the vehicle deviated from the guide route, is more complicated than that of an intersection shaped of crossroad. For instance, when the configuration of the branch point is a junction of five or six roads, or a junction with an overpass/underpass, vehicle's mistaken deviation from the guide route is determined to be caused by complexity in the configuration of the branch point. Further, a junction of four roads may not be shaped of a crossroad as it is, and an angle between adjoining exit roads may be less than 90 degrees. This configuration of the branch point may confuse an accurate exit road; therefore, this configuration is regarded as being complicated.

Another vehicle's mistaken deviation is determined in the following case: A branch point, at which the vehicle deviates from a guide route, is an intersection; and this intersection is located within a predetermined distance from an adjoining intersection. Multiple intersections close to each other may confuse designation of an accurate guide-target intersection from among the multiple intersections to thereby cause the vehicle to mistakenly deviate from the guide route.

Another vehicle's mistaken deviation is determined when the vehicle deviates and continues to depart from a destination. This is because the user may not intentionally take a route to depart from a destination. Further, a vehicle's mistaken deviation is determined in the following case: The vehicle deviates from the guide route and a guide route to the destination is then re-designated; and the distance of the re-designated guide route becomes longer than that of the former or original guide route by a predetermined distance.

Another vehicle's mistaken deviation is determined when the vehicle deviates and enters a road defined as a town narrow road. Having designated a guide route may indicate that the user is unfamiliar with roads thereabouts. In this situation, the user might not intentionally travel a town narrow road.

Another vehicle's mistaken deviation is determined when the vehicle deviates from a guide route and enters a road heading for an area having no connection with other than this guide route. For instance, a certain area such as a residential area may be connected only with a certain main road and not accessible to another main road such as national road or prefectural road. In this situation, when the vehicle moves from the certain main road of the guide route to the certain area, the vehicle is determined to mistakenly deviate from the guide route.

Another vehicle's mistaken deviation is determined when the vehicle deviates from a guide route and then changes the heading direction to an almost reversed direction. When the vehicle U-turns or turns to the same direction in multiple times, and eventually changes the heading direction to an almost reversed direction, the user of the vehicle is assumed to realize a mistake regarding a route and try to correct this mistake.

Another vehicle's mistaken deviation is determined when the vehicle deviates from a guide route and then returns to the guide route. This is because returning to the original guide route means that the user of the vehicle mistakenly deviates from the guide route although trying to follow the guide route.

Another vehicle's mistaken deviation is determined when the vehicle goes straight ahead with a direction indictor of the vehicle operated and deviates from a guide route, or when the vehicle turns without the direction indictor operated and deviates from a guide route. In these cases, the user may be uncertain about a route to take, and may mistakenly deviate from the guide route.

In contrast, a vehicle's intentional deviation from a guide route is determined when the vehicle turns to a direction opposite to a direction indicated based on the guide route and deviates from the guide route. Daring to turn to the direction opposite to the direction indicated based on the guide route may mean that the user of the vehicle intentionally deviates from the guide route.

Another vehicle's intentional deviation from a guide route is determined when the vehicle turns to the direction that is indicated by the direction indicator operated and deviates from the guide route. In this case, the vehicle's intentional deviation is determined since it is assumed that the user takes a route as intended.

Another vehicle's intentional deviation from a guide route is determined when the vehicle deviates from the guide route and then stops at a position, which is different from a destination or passing points included in the guide route. This is because the user is assumed to change the destination or passing points while driving and therefore intentionally deviate from the guide route. Stopping the vehicle is determined based on whether the engine of the vehicle stops.

Thus, at Step S230 a guide route deviation cause is determined. At Step S240, it is determined whether a vehicle's deviation from the guide route is intentional or mistaken (unintentional) based on the determination result at Step S230. When the deviation is determined to be unintentional or mistaken, the sequence goes to Step S250. At Step S250, a state of the branch point, at which the vehicle has deviated from the guide route, is memorized. In contrast, when the user intentionally deviates from the guide route at a certain branch point, the user may not need a guide for preventing deviation at a branch point having a state similar to that of the certain branch point.

However, memorizing the state of the certain branch point at which the user intentionally deviated from the guide route may help determination of either intentional or unintentional deviation when the vehicle deviates from a guide route afterward. Therefore, the state of the certain branch point at which the user intentionally deviated may be optionally memorized.

(Modifications)

In the above example, when a guide-target branch point is determined to be a branch point at which the vehicle is apt to mistake a guide route, an audio guide to draw user's attention is performed in addition to a usual guide for the guide-target branch point. However, another method to draw user's attention can be adopted.

For instance, the number of route guides may be increased for the above branch point, at which the user is apt to mistake a guide route. This may prompt the user not to mistake a guide route and cause the user to recognize that the guide-target branch point be a branch point at which user is apt to mistake the guide route.

An enlarged image for a guide-target branch point is displayed on the display device 8 in the usual guide. Here, two enlarged images may be displayed using two screen windows individually having almost half screen areas instead of a single enlarged image to cover the whole screen area. In this case, when a certain guide-target branch point is a point at which the user is apt to mistake a guide route, the screen area for displaying the certain guide-target branch point may be enlarged than the usual half screen area. This visually teaches the user that the certain guide-target branch point is a branch point at which the user is apt to mistake a guide route, and provides the enlarged image of the certain guide-target branch point in an easily understandable manner.

Further, in displaying an enlarged image, a display manner may be varied depending on whether or not a guide-target branch point is a branch point at which the user is apt to mistake a guide route. For instance, to highlight the point, a display color of the enlarged guide-target branch point may be visually distinctively used, or a mark (e.g., circling the point) may be added. This also visually teaches the user that the guide-target branch point is a branch point at which the user is apt to mistake a guide route.

In the above example, each time a user mistakenly deviates from a guide route, a state of a route-deviated branch point is memorized, which learns tendency of the user in mistaking the guide route. For instance, when the user increases a knowledge of driving or road states, the state to cause the user to mistake a guide route may vary depending on the user's knowledge. As a result, the user may successfully drive to follow the guide route even at the guide-target branch point, at which the user mistook the guide route in the past.

Thus, when the user drives accurately to follow the guide route at a certain branch point, at which the user mistook the same guide route in the past, the memorized state of the certain branch point may be eliminated from the branch point state database, i.e., the database is amended in the state of the certain branch point. Here, it is preferable that the memorized state is eliminated only when the vehicle travels accurately to follow the guide route more than N times (N: predetermined positive integer). It is because the user is assumed to become certain about not mistaking the guide route at the branch point, at which the user mistook the guide route in the past, after the multiple (predetermined N times) travels. Eliminating the memorized state may be executed when the vehicle successfully passes through the certain branch point or when the vehicle afterward arrives at the destination.

In the above example, a guide for drawing the user's attention to a route-deviated branch point may be practically performed after the tendency of the user is learned and memorized states are accumulated to a significant volume.

Additional data (or states) may be beforehand prepared and stored. For instance, multiple users are grouped by years of driving experience, driving frequencies, ages, or the like; the states to cause a mistake of a guide route, e.g., the states that users are apt to mistake guides routes, are investigated with respect to each of the groups. Just after the navigation system is initially installed in the vehicle, the above investigated states are stored as preliminary data in the branch point state database, and a user of the vehicle registers his/her profile or characteristics. This procedure can appropriately provide a guide for drawing a user's attention to a branch point, at which the user of the vehicle is apt to mistake a guide route, from when the navigation system is initially installed.

The above preliminary data may be preferably amended based on presence/absence of a vehicle's deviation from a guide route with respect to each user. This allows performance of a guide suitable for each user in preventing deviation from a guide route.

In the above example, after a guide route is designated, it is determined whether a guide-target branch point is a point at which a guide route is mistaken based on whether the state of the guide-target branch point is similar to a memorized state of a branch point.

In contrast, another procedure may be adopted when a guide route is retrieved with a destination designated. For instance, when a candidate route includes a certain branch point, at which a guide route is apt to be mistaken, its route cost is increased to exclude the certain branch point from a guide route as much as possible.

Furthermore, when facilities around a current position is retrieved by designating a desired facility type, the navigation system may retrieve only a facility, which the vehicle reaches by using a route not including a branch point, at which a guide route is apt to be mistaken.

Each or any combination of processes, steps, or means explained in the above can be achieved as a software unit (e.g., subroutine) and/or a hardware unit. (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A navigation system for a vehicle, the system comprising:
    a position detector configured to detect a current position of the vehicle;
    a map data storage unit configured with a computer readable storage medium to store road map data;
    a route designating unit configured to designate a guide route to a destination based on the road map data and the current position;
    a route guide unit configured to output a guide to indicate a route for the vehicle to take at a guide-target branch point, which is a target for the guide on a guide route, when the vehicle approaches the guide-target branch point;
    a state storage unit configured to store states of route-deviated branch points, each route-deviated branch point being a branch point at which the vehicle deviated from a guide route in a past, the state of each route-deviated branch point including at least one state item of:
        (i) a configuration of the each route-deviated branch point;
        (ii) a relationship with a neighboring branch point; and
        (iii) a road environment arising when entering the each route-deviated branch point;
    a similarity determining unit configured to determine whether a state of the guide-target branch point, which is obtained from the road map data stored in the map data storage unit, is similar to one of the states of the route-deviated branch points, which are stored in the state storage unit, by comparing with respect to the at least one state item, the guide-target branch point being a different point than the route-deviated branch points;
    a guide change unit configured to change a manner of a guide at the guide-target branch point by adding a guide for preventing deviation from the guide route when the state of the guide-target branch point is determined to be similar to the one of the stored at least one state items of the route-deviated branch points, in comparison with a case when the at least one state item of the guide-target branch point is determined to be not similar to any one of the stored at least one state items of the route-deviated branch points; and
    a deviation determining unit configured to determine whether the vehicle deviates from a guide route at a branch point intentionally or mistakenly, wherein the state storage unit stores a state of the branch point when the deviation determining unit determines that the vehicle deviates from the guide route at the branch point mistakenly instead of intentionally,
    the deviation determining unit being further configured to determine that the vehicle has deviated from a guide route mistakenly instead of intentionally in one of conditions associated
        (i) when the vehicle deviates from the guide route to depart from the guide route,
        (ii) when the vehicle deviates from the certain guide route and then a guide route, which has a longer distance b a predetermined distance than the certain guide route, is designated,
        (iii) when the vehicle deviates from the guide route and enters a road corresponding to an alley in case each road in the road map data has a road type at least including a type of an alley,
        (iv) when the vehicle deviates from the guide route and then changes a heading direction to a reversed direction, and
        (v) when the vehicle deviates from the guide route and then returns to the guide route, and
    the deviation determining unit being further configured to determine that the vehicle has deviated from a guide route intentionally in a condition associated when the vehicle deviates from the guide route and stops at a position excluding the destination and passing points included in the guide route.

2. The navigation system of claim 1, wherein the deviation determining unit is configured to make, to the user, an inquiry of whether a vehicle's deviation from the guide route is intentional when the vehicle has deviated from the guide route, and the deviation determining unit determines whether the vehicle deviates from the guide route at the branch point intentionally or mistakenly based on a response of the user.

3. The navigation system claim 1, further comprising:
    a travel record storage unit configured to store a travel record of a road for the vehicle, wherein
    the deviation determining unit determines that the vehicle has mistakenly deviated from a guide route when the vehicle has moved from a guide route having a travel record of a certain frequency to a road having a travel record of a frequency smaller than the certain frequency.

4. The navigation system of claim 1, wherein the deviation determining unit determines that the vehicle has mistakenly deviated from a guide route when a branch point, at which the vehicle has deviated from the guide route, has a shape more complicated than a shape of a crossroad.

5. The navigation system of claim 1, wherein the deviation determining unit determines that the vehicle has mistakenly deviated from a guide route when a branch point, at which the vehicle has deviated from the guide route, is an intersection, which is located close to an adjoining intersection within a predetermined distance.

6. The navigation system of claim 1, wherein the deviation determining unit determines that the vehicle has mistakenly deviated from a guide route when the vehicle deviates from the guide route and enters a road heading for an area having no connection with other than the guide route.

7. The navigation system of claim 1, wherein
the deviation determining unit determines that the vehicle has mistakenly deviated from a guide route when the vehicle deviates from the guide route to go straight ahead although a direction indicator of the vehicle is operated or when the vehicle deviates from the guide route to turn although the direction indicator is not operated.

8. The navigation system of claim 1, wherein
the deviation determining unit determines that the vehicle has intentionally deviated from a guide route when the vehicle deviates from the guide route to turn to a direction opposite to a direction indicated based on the guide route.

9. The navigation system of claim 1, wherein
the deviation determining unit determines that the vehicle has intentionally deviated from a guide route when the vehicle deviates from the guide route to turn to a direction indicated by a direction indictor of the vehicle.

10. The navigation system of claim 1, wherein
when the vehicle travels to follow a guide route without deviating from the guide route at a certain branch point, at which the vehicle previously deviated from a guide route, the state storage unit eliminates a stored state of the certain branch point.

11. The navigation system of claim 10, wherein
the state storage unit eliminates the stored state of the certain branch point when the vehicle travels the guide route at the certain branch point without deviating horn the guide route not less than N times (N is a predetermined positive integer).

12. The navigation system of claim 10, wherein
in a case that the vehicle travels the guide route at the certain branch point without deviating from the guide route, the state storage unit eliminates the stored state of the certain branch point when the vehicle passes through the certain branch point or when the vehicle reaches the destination through the guide route.

13. The navigation system of claim 1, wherein
when the at least one state item of the guide-target branch point is determined to be similar to the one of the stored at least one state items, the guide change unit changes a manner of a guide at the guide-target branch point to add information indicating that the guide-target branch point is apt to cause the vehicle to deviate from the guide route.

14. The navigation system of claim 1, wherein
when the configuration of the guide-target branch point is determined to be similar to the one of the stored at least one state items, the guide change unit changes a manner of a guide at the guide-target branch point to increase a number of guides in comparison with a case when the configuration of the guide-target branch point is determined to be not similar to any one of the stored at least one state items.

15. The navigation system of claim 1, wherein
the route guide unit includes a display unit to indicate a route for the vehicle to take at a guide-target branch point by displaying an enlarged image of the guide-target branch point, and,
when the at least one state item of the guide-target branch point is determined to be similar to the one of the stored at least one state items, the guide change unit changes a manner of a guide at the guide-target branch point by increasing a display area in comparison with a case when the at least one state item of the guide-target branch point is determined to be not similar to any one of the stored at least one state items.

16. The navigation system of claim 1, wherein
the route guide unit includes a display unit to indicate a route for the vehicle to take at a guide-target branch point by displaying an enlarged image of the guide-target branch point, and,
when the at least one state item of the guide-target branch point is determined to be similar to the one of the stored at least one state items, the guide change unit changes a display manner for the guide-target branch point in the enlarged image of the guide-target branch point, in comparison with a case when the at least one state item of the guide-target branch point is determined to be not similar to any one of the stored at least one state items.

17. A route guide method in a navigation system for a vehicle, the navigation system including:
a position detector configured to detect a current position of the vehicle;
a map data storage unit configured with a computer readable storage medium to store road map data;
a route designating unit configured to designate a guide route to a destination based on the road map data and the current position; and
a route guide unit configured to output guide to indicate a route for the vehicle to take at a guide-target branch point, which is a target for the guide on a guide route, when the vehicle approaches the guide-target branch point,
the method comprising:
storing states of route-deviated branch points, each route-deviated branch point being a branch point at which the vehicle deviated from a guide route in a past, the state of each route-deviated branch point including at least one state item of
(i) a configuration of the each route-deviated branch point;
(ii) a relationship with a neighboring branch point; and
(iii) a road environment arising when entering the each route-deviated branch point;
determining whether at least one state item of a guide-target branch point, which is a target for a guide on a guide route, is similar to one of the stored at least one state items of the route-deviated branch points by comparing with respect to the at least one slate item, when the vehicle approaches the guide-target branch point, the guide-target branch point being a different point than the route-deviated branch points; and
changing a manner of a guide being outputted by the route guide unit at the guide-target branch point by adding a guide for preventing deviation from the guide route when the at least one state item of the guide-target branch point is determined to be similar to the one of the at least one state items of the route-deviated branch points, in comparison with a case when the at least one state item of the guide-target branch point is determined to be not similar to any one of the at least one state items of the route-deviated branch points; and
determining whether the vehicle deviates from a guide route at a branch point intentionally or mistakenly, wherein a state of the branch point is stored newly when it is determined that the vehicle deviates from the guide route at the branch point mistakenly instead of intentionally,
wherein it is determined that the vehicle has deviated from a guide route mistakenly instead of intentionally in one of conditions associated
(i) when the vehicle deviates from the guide route to depart from the guide route, (ii) when the vehicle deviates from the certain guide route and then guide route, which has a longer distance by a predetermined distance than the certain guide route, is designated, (iii) when the vehicle deviates from the guide route and enters a road corresponding to an alley in case each road in the road map data has a road type at least including a type of an alley, (iv) when the vehicle deviates from the guide route and then changes a heading direction to a reversed direction, and (v) when the vehicle deviates from the guide route and then returns to the guide route, and wherein it is determined that the vehicle has deviated from a guide route intentionally on a condition associated when the vehicle deviates from the guide route and stops at a position excluding the destination and passing points included in the guide route.

18. The navigation system of claim 1, wherein
the configuration of the each route-deviated branch point included in the at least one state item includes a number of exit roads with respect to an entrance road.

19. The navigation system of claim 1, wherein
the configuration of the each route-deviated branch point included in the at least one state item includes individual angles of exit roads, with respect to an entrance road.

20. The navigation system of claim 1, wherein
the relationship with the neighboring branch point of the each route-deviated branch point included in the at least one state item includes a distance to the neighboring branch point or similarity between the guide-target branch point and the neighboring branch point in the configuration.

21. The navigation system of claim 1, wherein
the road-entering environment of the each route-deviated branch point included in the at least one state item includes (i) information that an exit road is shaded by a building to be not clearly viewed, and (ii) presence/absence of a landmark facility, a sign board, traffic lights, or a branch point name.

22. A computer readable storage medium comprising computer executable instructions for performing the method according to claim 17.

* * * * *